United States Patent [19]

Ishiyama

[11] Patent Number: 4,989,773
[45] Date of Patent: Feb. 5, 1991

[54] METHOD OF JOINING GRAPHITE AND METALLIC MATERIAL WITH A MATERIAL COMPRISING TITANIUM, NICKEL AND COPPER

[75] Inventor: Sintarou Ishiyama, Tokaimura, Japan
[73] Assignee: Japan Atomic Energy Research Institute, Tokyo, Japan
[21] Appl. No.: 312,973
[22] Filed: Feb. 21, 1989

Related U.S. Application Data

[62] Division of Ser. No. 112,271, Oct. 26, 1987, abandoned.

[30] Foreign Application Priority Data

Oct. 31, 1986 [JP] Japan .................................. 61-258155

[51] Int. Cl.$^5$ ........................ B23K 1/19; B23K 103/16
[52] U.S. Cl. ................................ 228/122; 228/234; 228/263.12
[58] Field of Search ............... 228/121, 122, 123, 124, 228/263.12, 234, 219, 221, 248; 420/417

[56] References Cited

U.S. PATENT DOCUMENTS

| | | | |
|---|---|---|---|
| 3,594,895 | 7/1971 | Hill | 228/263.12 |
| 3,787,958 | 1/1974 | Freedman et al. | 228/122 |
| 4,143,802 | 3/1979 | Winterbottom | 228/221 |
| 4,703,884 | 11/1987 | Landingham et al. | 228/122 |
| 4,727,633 | 3/1988 | Herrick | 228/122 |
| 4,740,252 | 4/1988 | Hasegawa et al. | 228/248 |
| 4,774,953 | 10/1988 | Foote | 228/263.12 |

FOREIGN PATENT DOCUMENTS

| | | | |
|---|---|---|---|
| 582926 | 12/1977 | U.S.S.R. | 228/248 |
| 682331 | 8/1979 | U.S.S.R. | 228/122 |
| 813829 | 5/1959 | United Kingdom | 228/122 |

OTHER PUBLICATIONS

Lindquist, Lloyd O. and Mah, Richard, "Graphite–To–Metal Bonding Techniques", Los Alamos Scientific Laboratory, University of California, Los Alamos NM, Published 1978.
Chemical Abstracts, "Graphite-to-Metal Bonding Techniques", p. 375, vol. 90, 1979.

Primary Examiner—Sam Heinrich
Attorney, Agent, or Firm—Oblon, Spivak, McClelland, Maier & Neustadt

[57] ABSTRACT

A method for joining graphite and metallic material with a material comprising titanium, nickel and copper in a composition ratio of, by weight,
Ti 69–57
Ni 24–20
Cu 7–23.

5 Claims, 1 Drawing Sheet

3

METHOD OF JOINING GRAPHITE AND METALLIC MATERIAL WITH A MATERIAL COMPRISING TITANIUM, NICKEL AND COPPER

This is a division of application Ser. No. 07/112,271, filed Oct. 26, 1987 now abandoned.

BACKGROUND OF THE INVENTION

The present invention relates to a material for joining graphite and metallic material, and to a method of joining them.

More particularly, the present invention relates to a joining material of general graphite material (neuclear reactor class, for electrode, specific graphite material) and general metallic material (particularly, refractory material, reactor material, good thermal conductive material), which can be used as a structual material and a portion thereof in a field of ordinary temperature and specific high temperature, and to a joining method using the same.

As a prior art of joining of graphite and metal, a technique using graphite/copper (Lloyd O. Lindquist and Richard MAH.: LA-6928-MS, (1977) ), graphite/molybdenum (M. Fukutomi, et al: J. of Nuclear Materials, 128 and 129, 908 (1984) ) and others has been known, but there has been no such instance as joining of graphite and various alloys as SUS, Hastelloy, Incolloy and Inconel systems. Further, even in the above described joining cases, the joining of graphite to a large scale of base material has been often impossible because the melting temperature of joining material is so high that the material is degenerated at the joining time and a crack is produced due to the great difference between graphite and metal in thermal expansion and also because the joining condition is special. Numerous problems they are present to overcome for practical use of the joining method.

SUMMARY OF THE INVENTION

An object of the present invention is to provide a joining material used in a technique for protecting a structural rerfractory metallic material from a special high temperature atmosphere, in particular in a technique of joining the first wall of nuclear fusion reactor and its surrounding apparatuses with graphite to decrease damages suffered from plasma and to improve their coexistence with plasma, and to a joining method using the same.

In the figure,
1 is a graphite layer;
2 is a jointing material layer; and
3 is a molybdenum plate.

Figure 2:
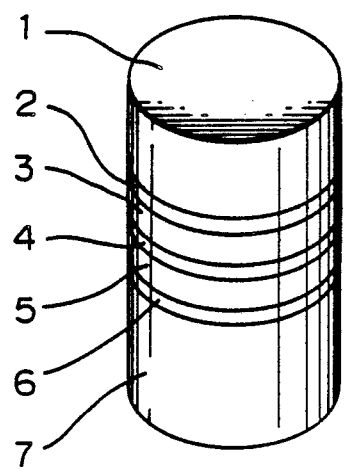

FIG. 2 is a diagram showing a seven-layer construction of joining of graphite and a metallic material greatly different therefrom in the coefficient of thermal expansion, for example SUS 316.

In the figure,
1 is a graphite layer;
2 is a joining material layer;
3 is a molybdenum plate;
4 is a joining material layer;
5 is a nickel plate;
6 is a joining material layer; and
7 is a SUS 316.

DETAILED DESCRIPTION OF THE PREFERRED EMBODIMENT:

The joining material of the present invention must have a melting temperature near 1000° C. so that the joining metallic material (copper, SUS system, Hastelloy, Incolloy, molybdenum and others) is not degenerated at the time of joining heat treatment, and simultaneously must have excellent wettability with graphite and the metallic material.

As the result of numerous experiments, the present inventor has obtained, as one satisfying these requirements, a joining material comprising titanium, nickel and copper in a composition ratio of, by weight, Ti 69–57
Ni 24–20
Cu 7–23.

The joining material of the present invention is called "titanic wax material" and can be used in powder or other forms according to its use.

In joining graphite and metal using the joining material of the present invention, a heating oven is employed which is maintained at a high vacuum above $10^{-5}$ torr in degree of vacuum and at an elevated temperature above 1100° C. and the joining is carried out in an argon atmosphere. At the time of heating the heating rate is not specified in particular. The maximum temperature at the time of joining is approximate 980°–1200° C. and the temperature is necessary to be maintained for about 1–50 minutes. At the time of cooling the cooling rate must be below 20° C. per minute. And also the jointing zone at the time of jointing must be held in a state uniformly heated.

Figure 1:
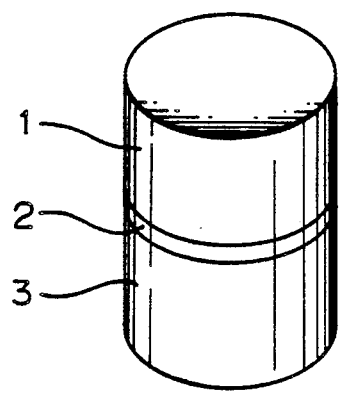
FIG. 1 is a diagram showing a three-layer construction of joining of graphite and a metallic material having a close coefficient of thermal expansion, for example molybdenum.

In case of joining graphite and a metallic material having a close coefficient of thermal expansion, such as molybdenum and others, the joining can be carried out as graphite—joining material—molybdenum, as shown in FIG. 1, while, in case of joining graphite and a metallic material greatly different therefrom in the coefficient of thermal expansion, for example SUS 316, the joining is carried out in a seven-layer construction as graphite—joining material—molybdenum plate—joining material—nickel plate—joining material—SUS 316, as shown in FIG. 2. In this case, as the result of a joining test, the thickness of the metal sheet, molybdenum plate and nickel plate, which is an intermediate layer, is necessary to be above 1 mm, as shown in Table 1.

TABLE 1

| Nickel plate | Molybdenum Plate | Results of joining |
| --- | --- | --- |
| 0.2 mm | 0.3 mm | No good |
| 1.0 mm | 0.3 mm | No good |
| 1.0 mm | 0.5 mm | No good |
| 1.0 mm | 1.0 mm | Good |
| 1.0 mm | 2.0 mm | Good |
| 1.0 mm | 3.0 mm | Good |
| 1.0 mm | 5.0 mm | Good |

EXAMPLE

The combination of graphite and metallic material in which a joining test has been successfully performed using the joining material of the present invention was as follows:

| Graphite | Metallic material | Joining construction |
|---|---|---|
| Nuclear reactor class (IG-110, ATJ, G140A, PGX etc.) | Molybdenum | Three-layer |
| Nuclear reactor class (IG-110, ATJ, G140A, PGX etc.) | Hastelloy | Seven-layer |
| Specific graphite (C-C Composite, Pyro-carbon) | Incolloy | Seven-layer |
| Specific graphite (C-C Composite, Pyro-carbon) | SUS 316, 304 | Seven-layer |
| Specific graphite (C-C Composite, Pyro-carbon) | Copper | Seven-layer |

In the nuclear fusion reactor FER (Fusion Experimental Reactor) the heat-removing efficiency is expected to be improved by joining SUS 316 of a first wall to graphite, and thereby the dimension of a reactor can be reduced.

What is claimed is:

1. A method for joining graphite and metallic material, comprising joining graphite and metallic material in an argon atmosphere using a joining material comprising titanium, nickel and copper in a composition ratio of, by weight, Ti 69–57
Ni 24–20
Cu 7–23 at a vacuum above $10^{-5}$ torr and at a temperature above 1100° C.

2. The method according to claim 1, wherein the joining material is in the form of a powder.

3. The method according to claim 1 or 2, wherein molybdenum is joined to graphite.

4. The method according to claims 1 or 2, wherein a seven-layer construction of graphite-joining material-molybdenum-joining material-nickel-joining material-SUS 316 is prepared.

5. The method according to claim 4, wherein molybdenum plates and nickel parts are joined, each having a thickness of at least 1.0 mm.

* * * * *